United States Patent [19]

Holberry

[11] 4,038,926
[45] Aug. 2, 1977

[54] TROLLEY CONVEYOR SYSTEM WITH MAGNETICALLY ACTUATED READING MEANS

[75] Inventor: Charles Thomas Holberry, Wolverhampton, England

[73] Assignee: Redman Fisher Engineering Limited, Tipton, England

[21] Appl. No.: 686,582

[22] Filed: May 14, 1976

[30] Foreign Application Priority Data
Jan. 23, 1976 United Kingdom ............... 2612/76

[51] Int. Cl.² .................... B61J 3/00; B61L 13/04
[52] U.S. Cl. .................................. 104/88; 246/249; 335/207
[58] Field of Search ............... 104/88; 246/247, 249; 335/205, 207, 229

[56] References Cited
U.S. PATENT DOCUMENTS

| | | | |
|---|---|---|---|
| 3,074,353 | 1/1963 | Devonshire et al. | 104/88 |
| 3,168,268 | 2/1965 | Bossart et al. | 104/88 X |
| 3,532,059 | 10/1970 | Frantz | 104/88 |

FOREIGN PATENT DOCUMENTS

| | | | |
|---|---|---|---|
| 460,127 | 9/1968 | Switzerland | 335/207 |
| 1,188,009 | 4/1970 | United Kingdom | |

*Primary Examiner*—Trygve M. Blix
*Assistant Examiner*—Barry L. Kelmachter
*Attorney, Agent, or Firm*—Merriam, Marshall, Shapiro & Klose

[57] ABSTRACT

A conveyor comprising a trolley movable along a track and having at least one elongate member of ferromagnetic material which is settable in a position selected according to a code to convey information concerning the destination of the trolley. At a reading station on the track, there is a row of magnetically-operated switches with magnetic shields between them. With each switch there is associated a pair of magnets disposed on opposite sides of the switch with one magnet of the pair between the switch and the path followed by the elongate member through the reading station. When aligned with the magnets of a switch, the elongate member operates the switch as the member passes through the reading station.

2 Claims, 4 Drawing Figures

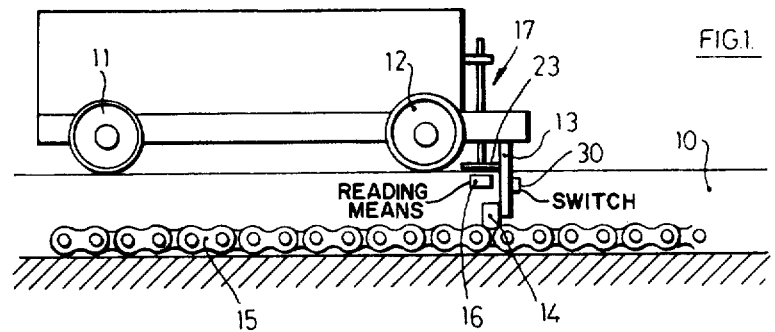
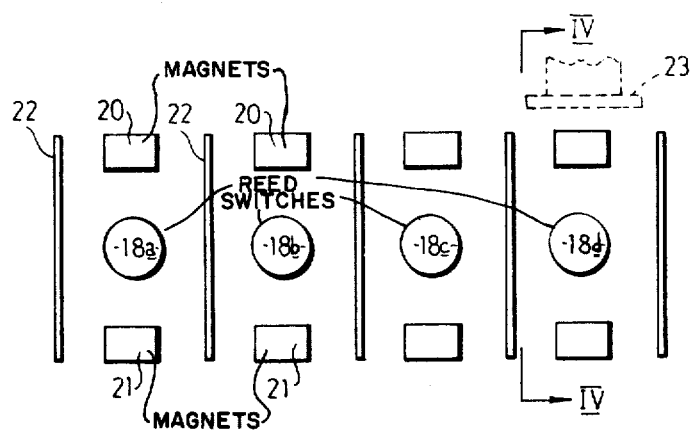
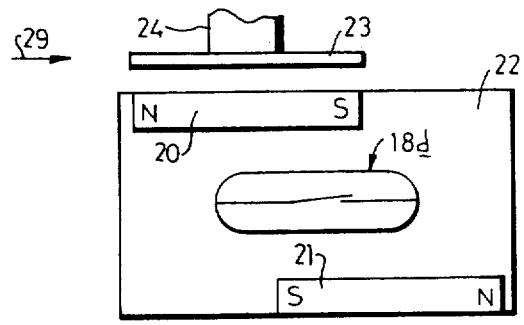
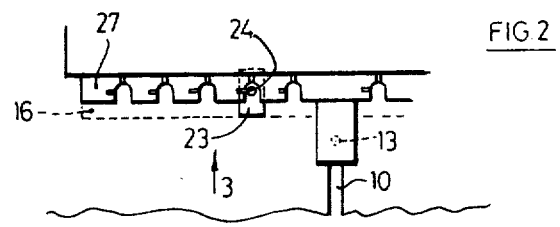

TROLLEY CONVEYOR SYSTEM WITH MAGNETICALLY ACTUATED READING MEANS

SUMMARY OF THE INVENTION

This invention relates to a conveyor system of the kind comprising a track, a trolley which runs along the track, information-carrying means on the trolley and reading means for reading information from the information-carrying means as the trolley passes through a reading station.

The information may concern the destination of the trolley or an operation to be carried out on a load borne by the trolley. For example, the reading means may be arranged to control operation of a track switch by means of which the trolley can be diverted onto a branch track.

One object of the present invention is to provide a conveyor system of the kind referred to having information-carrying means of simple, durable and inexpensive form and to provide reading means which is unlikely to be operated inadvertently but is not dependent upon very precise positioning of the information-carrying means as the latter moves through the reading station. A particular object is to provide reading means suitable for use with information-carrying means comprising a member of ferro-magnetic material which can be set in a selected one or several alternative positions on the trolley, which positions are near to each other, without risk that the reading means will read incorrectly the information represented by the position of the ferro-magnetic member.

According to the invention, the reading means of a conveyor system of the kind referred to includes a switch adapted to be actuated by a change in a magnetic field and a magnet situated between the switch and a path followed by the information-carrying means when the trolley moves through the reading station, the magnet being arranged with its poles spaced apart in a direction substantially parallel to said path.

The reading means preferably comprises a further magnet situated on the side of the switch opposite to the first-mentioned magnet. The two magnets may be so arranged that, in the region of the switch, their respective fields are in opposition and, in the absence of any extraneous ferro-magnetic member in the vicinity of the reading means, the magnetic field strength at the switch is substantially zero.

BRIEF DESCRIPTION OF THE DRAWINGS.

One embodiment of the invention will now be described, by way of example, with reference to the accompanying drawings, wherein:

FIG. 1 shows an elevation of a part of a conveyor system,

FIG. 2 is a fragmentary plan view of certain parts of the conveyor shown in FIG. 1, the parts being shown on a larger scale, FIG. 3 is a view on the arrow 3 of FIG. 2 of a part of a reading means of the conveyor system, and FIG. 4 is a section on the line IV — IV of FIG. 3.

The conveyor system illustrated in the accompanying drawings is a tow line conveyor system comprising a track in the form of a slot 10 in a floor surface and a number of trolleys which run along the track, only one of these trolleys being shown. The trolley has rear wheels 11 and front wheels 12 which run on the floor surface. The front wheels 12 are steerable and are connected to a depending tow pin 13 which is engaged by a driving pawl 14 carried on a chain 15 which is disposed within and is drawn along the slot 10. The track is branched and at the junction of each branch slot with the main slot there is provided a track switch (not shown) for diverting trolleys into the branch slot as required. Such track switches are well known and will not be described herein.

For controlling the operation of the track switch there is provided at a reading station upstream of the track switch a reading means 16 for reading information from information-carrying means 17 on the trolley. The reading means is embedded in the floor beside the slot 10.

The reading means 16 comprises a row of magnetically actuable reed switches, which row is horizontal and extends laterally from each side of the slot 10. Four only of the reed switches, 18a to 18d, are shown in FIGS. 3 and 4 but the row typically comprises ten or more reed switches. The reed switches are connected electrically in a control circuit of the track switch. This control circuit also includes a mechanically actuable switch 30 which is situated in the slot for operation by the towing pin 13 when the trolley passes through the reading station. Signals provided by the reed switches 18a to 18d are effective to operate the track switch only when the mechanical switch 30 also is operated. This arrangement ensures that random operation of the reed switches by means other than the information-carrying means 17 of a trolley does not cause operation of the track switch.

With each of the reed switches 18a to 18d there is associated a pair of permanent magnets 20 and 21. These are spaced equally above and below the associated reed switch, the magnets 20 being situated just below the floor surface on which the trolley runs. Each magnet is arranged with its poles spaced apart in a direction lengthwise of the slot 10. b, magnets and reed switches are enclosed in a housing (not shown in FIGS. 3 and 4) of non-magnetic material. The housing prevents any debris which may be present on the 11 surface from entering the space occupied by the reed switches and magnets.

The space containing the reed switch 18a and its associated magnets 20 and 21 is enclosed laterally by a pair of screens 22 of ferro-magnetic material, these being situated one on each side of the space concerned. Similar screens are provided for the switches 18b, 18c and 18d, one screen being common to the switches 18a and 18b, a further screen being common to the switches 18b and 18c and a yet further screen being common to the switches 18c and 18d. Each screen 22 is vertical and extends from a position adjacent to the magnet 20 to a position adjacent to the magnet 21. The effect of each screen on the field of the magnet 20 is the same as its effect on the field of the magnet 21. Any difference in the respective strengths of these fields at the associated switch is not affected by the presence of the screens.

As shown in FIG. 4, the magnets 20 and 21 associated with the reed switch 18d are arranged with opposite polarities and are off-set from one another somewhat in the direction of their lengths. The arrangement is such that, in the region of the reed switch 18d, the field of the magnet 20 opposes that of the magnet 21. In the absence of extraneous ferro-magnetic material the magnetic flux in the reed switch is small, or even zero. If a member of ferro-magnetic material is moved into a position overlying the magnet 20, the field of this magnet will be changed and the magnetic flux to which the reed switch 18d is subjected will be increased to a value such that the switch is actuated. It will be noted that the magnets 20 and 21 associated with a single reed switch are included in a common magnetic circuit and that each of these magnets directs magnetic flux in the same direction around this circuit.

The information-carrying means 17 of the trolley comprises a rectangular plate 23 of ferro-magnetic material secured to the lower end of a vertical support rod 24. The support rod is mounted on the trolley in such a position that it passes directly above one of the reed switches 18a to 18d when the trolley passes through the reading station. The support rod can be turned relative to the trolley about its own axis through an angle of 90° between operative and inoperative positions of the plate 23. These positions are defined by angularly spaced recesses 25 and 26 formed in a plate 27 on the trolley to receive a locating pin 28 which projects horizontally from the support rod 24. The plate 27 defines alternative positions for the support rod 24, corresponding respectively to the switches 18a to 18d.

In the operative position, the plate 23 is arranged with its length parallel to that of the magnets 20 and 21. In this position, the plate actuates whichever of the reed switches 18a to 18d it passes directly over. The plate provides an alternative path for magnetic flux from the upper magnet and so reduces the strength of the field of this magnet in the vicinity of the reed switch. The screens 22 prevent the magnetic fields associated with the other reed switches being changed significantly. In its inoperative position, the plate 23 is arranged with its length perpendicular to the lengths of the magnets 20 and 21. In this position, the plate will not change the magnetic field associated with any of the reed switches sufficiently to actuate a switch. It will be appreciated that the width of the plate 23 is considerably less than the length of the magnets 20. When in its inoperative position, the plate 23 can overlie only a part of one of the magnets 20 at any moment. As will be seen from FIG. 4, the length of the plate is at least equal to the length of the magnet 20.

The plate 23 is intended to move through the reading station in the direction shown by arrow 29 in FIG. 4 along a path having a centre line which lies in a vertical plane intersecting the reed switch concerned. If the actual path of the plate 23 is off-set somewhat laterally from this intended path, operation of the reading means will not be affected unless the misalignment is so severe that the centre of the path of travel of the plate 23 falls in or close to the plane of a face of a screen 22 associated with the reed switch which is intended to be operated. Similarly, the vertical spacing between the magnet 20 and the path of travel of the plate 23 can vary somewhat without affecting operation of the reading means.

The tolerance of the reading means to misalignment between the centre line of the path along which the plate 23 moves and the vertical plane intersecting the reed switch depends upon the width of the plate. To increase this tolerance, the width of the plate can be increased and to reduce this tolerance, the width of the plate is decreased. One factor which is considered when determining the width to be used in a particular system is the spacing between adjacent reed switches, in a system where reed switches are arranged side-by-side, and the spacing between alternative positions of the plate 23, in a system where this plate can be set in one of several alternative positions on the trolley according to the particular reed switch which is required to be operated by a plate. The length of the plate 23 can be varied according to the period for which the reed switch is required to remain in an operated condition.

The distance between the two screens 22 associated with a particular reed switch can be quite small, for example less than two inches, so that the separation of adjacent mounting positions for the support rods on a trolley can be correspondingly small. Both the information-carrying means on the trolley and the reading means associated with the track can be compact.

Typically, the screens associated with one reed switch may be 1¼ inches apart and each 1¼ inches square. The magnets may have a width and depth of ¼ inch and be separated from the capsule of the reed switch by ¼ inch. With these dimensions, a plate 23 having dimensions of approximately 2 inches by ¼ inch by 1/32 inch is suitable.

One or both of the magnets associated with each reed switch may be adjustable so that the position of the magnet relative to the switch and to the other magnet can be varied. In this way, the sensitivity of the reading means can be varied. The sensitivity may be varied by adjustment of a magnet during manufacture of the reading means to achieve maximum sensitivity or such other sensitivity as may be appropriate in particular circumstances. If, for example, it is found that a plate 23 intended for use with the reading means has a width such that the reed switch is operated even when the plate is transverse to the reed switch, the sensitivity of the reading means may be reduced accordingly until the reading means responds only to the plate when it is in alignment with the reed switch.

I claim:

1. In a conveyor system comprising a track, a trolley which runs along the track, information-carrying means on the trolley and reading means at a reading station on the track for reading information from the information-carrying means as the trolley passes through the reading station, the improvement wherein the reading means comprises a switch and two magnets associated therewith, said switch being adapted to be actuated by changes in the field of said magnets, said magnets being arranged on opposite sides of the switch;

one magnet being situated between the switch and the path followed by the information-carrying means when the trolley moves through the reading station;

both of said magnets being arranged with their respective poles spaced apart in a direction substantially parallel to said path, one of said magnets being off-set in the direction of its length from the other of said magnets;

said switch and said magnets being disposed in a space; and screens of ferro-magnetic material arranged on opposite sides of said space, each screen extending from a position adjacent one of said magnets to a position adjacent the other of said magnets.

2. The improvement according to claim 1 wherein the reading means comprises a plurality of switches arranged in a row extending transversely of the track, a pair of spaced magnets associated with each of said switches, each switch being disposed between the magnets of a corresponding pair, one magnet of each pair being situated between the associated switch and the path followed by the information-carrying means when the trolley moves through the reading station and a plurality of screens of ferro-magnetic material, one of said screens being located between each pair of adjacent switches in the row.

* * * * *